United States Patent
Giles et al.

(10) Patent No.: US 10,989,456 B2
(45) Date of Patent: *Apr. 27, 2021

(54) METHOD AND APPARATUS FOR COMMON MANIFOLD CHARGE COMPENSATOR

(71) Applicant: Lennox Industries Inc., Richardson, TX (US)

(72) Inventors: Eric Giles, Royse City, TX (US); Rakesh Goel, Irving, TX (US); Siddarth Rajan, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,884

(22) Filed: Mar. 5, 2020

(65) Prior Publication Data

US 2020/0200452 A1 Jun. 25, 2020

Related U.S. Application Data

(63) Continuation of application No. 15/957,075, filed on Apr. 19, 2018, now Pat. No. 10,663,199.

(51) Int. Cl.
*F25B 41/40* (2021.01)
*F25B 39/04* (2006.01)
*F25B 41/34* (2021.01)

(52) U.S. Cl.
CPC ............. *F25B 41/40* (2021.01); *F25B 39/04* (2013.01); *F25B 41/34* (2021.01)

(58) Field of Classification Search
CPC .. F25B 41/003; F25B 39/04; F25B 2341/065; F25B 2400/16; F25B 2400/0403; F25B 6/04

USPC ......................................................... 62/115
See application file for complete search history.

(56) References Cited

U.S. PATENT DOCUMENTS

| | | | |
|---|---|---|---|
| 1,944,899 | A | 1/1934 | Miller |
| 3,563,304 | A | 2/1971 | McGrath |
| 3,643,462 | A | 2/1972 | Eberhart |
| 3,777,508 | A | 12/1973 | Imabayashi et al. |
| 4,030,315 | A | 6/1977 | Harnish |
| 4,110,998 | A | 9/1978 | Owen |
| 4,215,555 | A | 8/1980 | Cann et al. |

(Continued)

FOREIGN PATENT DOCUMENTS

| | | |
|---|---|---|
| DE | 10317551 B3 | 4/2004 |
| EP | 1821048 A2 | 8/2007 |

(Continued)

OTHER PUBLICATIONS

U.S. Appl. No. 16/014,436, Bachellor.

(Continued)

*Primary Examiner* — Steve S Tanenbaum
(74) *Attorney, Agent, or Firm* — Shackelford, Bowen, McKinley & Norton, LLP

(57) ABSTRACT

An HVAC system includes an evaporator. A compressor is fluidly coupled to the evaporator via a suction line. A condenser is fluidly coupled to the compressor via a discharge line. The condenser includes a first pass and a second pass. A common manifold fluidly couples the first pass and the second pass. A charge compensator is fluidly coupled to the common manifold above a maximum liquid level of the common manifold.

17 Claims, 6 Drawing Sheets

(56) References Cited

U.S. PATENT DOCUMENTS

| | | |
|---|---|---|
| 4,242,873 A | 1/1981 | Hino |
| 4,383,419 A | 5/1983 | Bottum |
| 4,437,317 A | 3/1984 | Ibrahim |
| 4,480,446 A | 11/1984 | Margulefsky et al. |
| 4,522,037 A | 6/1985 | Ares et al. |
| 4,551,983 A | 11/1985 | Atsumi et al. |
| 4,554,792 A | 11/1985 | Margulefsky et al. |
| 4,655,051 A | 4/1987 | Jones |
| 4,766,734 A | 8/1988 | Dudley |
| 4,771,610 A | 9/1988 | Nakashima et al. |
| 4,861,561 A | 8/1989 | Pritchard |
| RE33,212 E | 5/1990 | Lower et al. |
| 4,942,743 A | 7/1990 | Gregory |
| 5,042,271 A | 8/1991 | Manz |
| 5,117,645 A | 6/1992 | Bryant |
| 5,136,855 A | 8/1992 | Lenarduzzi |
| 5,159,817 A | 11/1992 | Hojo et al. |
| 5,548,971 A | 8/1996 | Rockenfeller et al. |
| 5,628,200 A | 5/1997 | Pendergrass |
| 5,651,263 A | 7/1997 | Nonaka et al. |
| 5,651,265 A | 7/1997 | Grenier |
| 5,653,120 A | 8/1997 | Meyer |
| 5,758,514 A | 6/1998 | Genung et al. |
| 5,802,859 A | 9/1998 | Zugibe |
| 5,848,537 A | 12/1998 | Biancardi et al. |
| 5,896,754 A | 4/1999 | Balthazard et al. |
| 5,937,665 A | 8/1999 | Kiessel et al. |
| 6,055,818 A | 5/2000 | Valle et al. |
| 6,470,704 B2 | 10/2002 | Shibata et al. |
| 6,904,963 B2 | 6/2005 | Hu |
| 8,051,675 B1 | 11/2011 | Carlson et al. |
| 8,602,093 B2 | 12/2013 | Iwasaki |
| 9,499,026 B2 | 11/2016 | Brodie et al. |
| 9,599,380 B2 | 3/2017 | Yamashita |
| 9,618,237 B2 | 4/2017 | Kim et al. |
| 9,644,906 B2 | 5/2017 | Shimamoto et al. |
| 9,651,287 B2 | 5/2017 | Morimoto et al. |
| 9,664,191 B2 | 5/2017 | Tanaka |
| 9,732,992 B2 | 8/2017 | Yamashita |
| 9,777,950 B2 | 10/2017 | Uselton |
| 9,823,000 B2 | 11/2017 | Wang |
| 9,834,063 B2 | 12/2017 | Kang et al. |
| 9,855,821 B2 | 1/2018 | Kang et al. |
| 9,862,251 B2 | 1/2018 | Brodie et al. |
| 10,330,358 B2 | 6/2019 | Goel |
| 2001/0029747 A1 | 10/2001 | Gaul |
| 2002/0003037 A1 | 1/2002 | Cousineau et al. |
| 2004/0000153 A1 | 1/2004 | Bagley |
| 2004/0025526 A1 | 2/2004 | Aflekt et al. |
| 2004/0148956 A1 | 8/2004 | Arshansky et al. |
| 2005/0066678 A1 | 3/2005 | Kamimura |
| 2005/0120733 A1 | 6/2005 | Healy et al. |
| 2005/0132728 A1 | 6/2005 | Lifson et al. |
| 2005/0247070 A1 | 11/2005 | Arshansky et al. |
| 2006/0010899 A1 | 1/2006 | Lifson et al. |
| 2006/0123834 A1 | 6/2006 | Hwang et al. |
| 2007/0193285 A1 | 8/2007 | Knight et al. |
| 2008/0034777 A1 | 2/2008 | Copeland et al. |
| 2008/0104975 A1 | 5/2008 | Gorbounov et al. |
| 2008/0296005 A1 | 12/2008 | Taras et al. |
| 2008/0314064 A1 | 12/2008 | Al-Eidan |
| 2009/0211283 A1 | 8/2009 | Koh et al. |
| 2009/0229285 A1 | 9/2009 | Sato et al. |
| 2009/0229300 A1 | 9/2009 | Fujimoto et al. |
| 2009/0241569 A1 | 10/2009 | Okada et al. |
| 2009/0241573 A1 | 10/2009 | Ikegami et al. |
| 2010/0064710 A1 | 3/2010 | Slaughter |
| 2010/0218513 A1 | 9/2010 | Vaisman et al. |
| 2010/0326075 A1 | 12/2010 | Fong et al. |
| 2011/0041523 A1 | 2/2011 | Taras et al. |
| 2011/0146321 A1 | 6/2011 | Jin |
| 2011/0154848 A1 | 6/2011 | Jin |
| 2011/0192176 A1 | 8/2011 | Kim et al. |
| 2011/0197600 A1 | 8/2011 | Hamada et al. |
| 2012/0111042 A1 | 5/2012 | Hamada et al. |
| 2012/0227426 A1 | 9/2012 | Deaconu |
| 2012/0227429 A1 | 9/2012 | Louvar et al. |
| 2012/0324911 A1 | 12/2012 | Shedd |
| 2013/0098088 A1* | 4/2013 | Lin .................. F25B 41/22 62/228.1 |
| 2013/0174595 A1 | 7/2013 | Okuda et al. |
| 2013/0340451 A1* | 12/2013 | Sapp .................. F28D 1/05391 62/115 |
| 2014/0311172 A1 | 10/2014 | Iwasaki |
| 2014/0326018 A1 | 11/2014 | Ignatiev |
| 2014/0345310 A1 | 11/2014 | Tamaki et al. |
| 2015/0020536 A1 | 1/2015 | Lee et al. |
| 2015/0040594 A1 | 2/2015 | Suzuki et al. |
| 2015/0075204 A1 | 3/2015 | Brodie et al. |
| 2015/0089967 A1 | 4/2015 | Kim et al. |
| 2015/0267925 A1 | 9/2015 | Inada et al. |
| 2015/0267946 A1 | 9/2015 | Lowstuter, Jr. et al. |
| 2015/0276271 A1 | 10/2015 | Uselton |
| 2015/0276290 A1 | 10/2015 | Aoyama |
| 2015/0330685 A1* | 11/2015 | Goel .................. G05D 16/2006 137/14 |
| 2016/0178222 A1 | 6/2016 | Bush et al. |
| 2016/0195311 A1 | 7/2016 | Li et al. |
| 2016/0273795 A1 | 9/2016 | Takenaka et al. |
| 2016/0298893 A1 | 10/2016 | Knatt et al. |
| 2017/0016659 A1 | 1/2017 | Chen et al. |
| 2017/0059219 A1 | 3/2017 | Goel |
| 2018/0094841 A1 | 4/2018 | Kester et al. |
| 2019/0323747 A1 | 10/2019 | Giles et al. |
| 2020/0124313 A1 | 4/2020 | Todoroki et al. |
| 2020/0240684 A1 | 7/2020 | Reardon et al. |

FOREIGN PATENT DOCUMENTS

| | | |
|---|---|---|
| JP | H05203275 A | 8/1993 |
| JP | 11248266 | 9/1999 |
| JP | 2002195705 A | 7/2002 |
| WO | WO-94/14016 A1 | 6/1994 |

OTHER PUBLICATIONS

Lattanzi, Matt and Priestley, Doug, Micro-Channel Evaporator-Coil Technology, RSES Journal [online], Oct. 2012, pp. 14-18, [retrieved on Sep. 30, 2017]. Retrieved from the internett <URL: https://www.rses.org/assets/rses_journal/1012_Evaporators.pdf>.

"Microchannel Coil Servicing Guidelines: Trane Unitary Light and Commercial Units", Trane [online], May 5, 2011, pp. 1-16, [retrieved on Sep. 30, 2017]. Retrieved from the internet <https://www.trane.com/content/dam/Trane/Commercial/lar/es/product-systems/comercial/Rooftops/Accesorios-Rooftops;/IOM/Microchannel%20IOM%20(Ingl%C3%A9s).pdf>.

Ito et al., Air Conditioner, Aug. 10, 1993, JPH05203275A Whole Document (Year: 1993).

\* cited by examiner

METHOD AND APPARATUS FOR COMMON MANIFOLD CHARGE COMPENSATOR

CROSS-REFERENCE TO RELATED APPLICATIONS

This application is a continuation of U.S. patent application Ser. No. 15/957,075, filed on Apr. 19, 2018, U.S. patent application Ser. No. 15/957,075; U.S. patent application Ser. No. 14/279,043, filed on May 15, 2014 and U.S. patent application Ser. No. 14/706,945, filed on May 7, 2015 are incorporated herein by reference.

TECHNICAL FIELD

The present disclosure relates generally to heating, ventilation, and air conditioning (HVAC) systems and applications and more particularly, but not by way of limitation, to methods and systems for relieving pressure within HVAC systems.

BACKGROUND

This section provides background information to facilitate a better understanding of the various aspects of the disclosure. It should be understood that the statements in this section of this document are to be read in this light, and not as admissions of prior art.

Currently, most HVAC systems utilize a charge compensator located in a liquid line downstream of a condenser as a way to accommodate variations in refrigerant discharge pressure. During normal operation, such liquid-line charge compensators are kept free of liquid by utilizing radiant heat from the condenser. This approach, however, is not effective in re-heat applications. When an HVAC system operates in re-heat mode, heat is first rejected from the refrigerant in a re-heat coil. By the time the refrigerant reaches the condenser, it is already saturated and not hot enough to drive liquid from the liquid-line condenser. This causes the HVAC system to operate undercharged resulting in significant loss of latent capacity in the re-heat mode.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

In one aspect, the present disclosure relates to a heating, ventilation, and air conditioning ("HVAC") system. The HVAC system includes an evaporator. A compressor is fluidly coupled to the evaporator via a suction line. A condenser is fluidly coupled to the compressor via a discharge line. The condenser includes a first pass and a second pass. A common manifold fluidly couples the first pass and the second pass. A charge compensator is fluidly coupled to the common manifold above a maximum liquid level of the common manifold.

In another aspect, the present disclosure relates to a condenser. The condenser includes a first pass and a second pass. A common manifold fluidly couples the first pass to the second pass. A charge compensator is fluidly coupled to the common manifold above a maximum liquid level of the common manifold via an upper connection line and a lower connection line.

In another aspect, the present invention relates to a method for addressing elevated discharge pressure. The method includes fluidly coupling a manifold to a first pass and to a second pass of a condenser. A charge compensator is fluidly coupled to the common manifold. The charge compensator is positioned above a maximum liquid level of the manifold.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
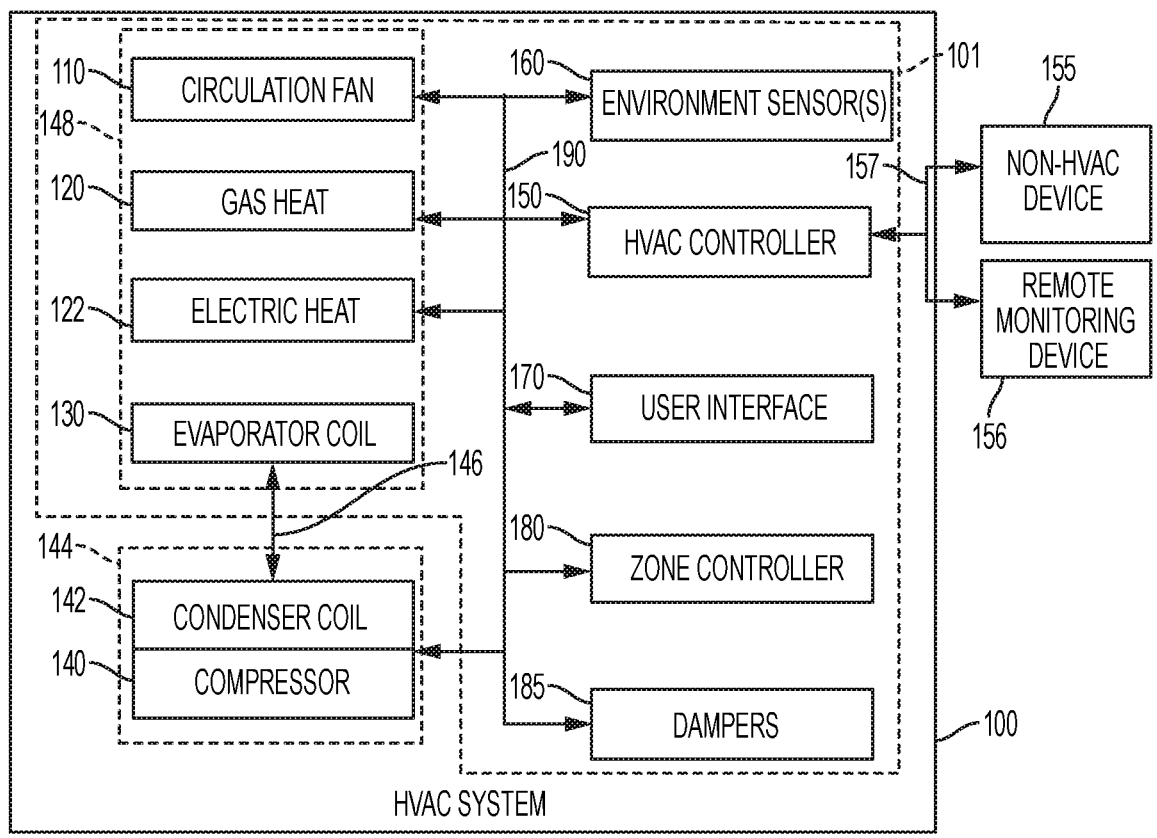
FIG. 1 is a block diagram of an exemplary HVAC system.

Various embodiments will now be described more fully with reference to the accompanying drawings. The disclosure may, however, be embodied in many different forms and should not be construed as limited to the embodiments set forth herein.

HVAC systems are frequently utilized to adjust both temperature of conditioned air as well as relative humidity of the conditioned air. A cooling capacity of an HVAC system is a combination of the HVAC system's sensible cooling capacity and latent cooling capacity. Sensible cooling capacity refers to an ability of the HVAC system to remove sensible heat from conditioned air. Latent cooling capacity refers to an ability of the HVAC system to remove latent heat from conditioned air. Sensible cooling capacity and latent cooling capacity vary with environmental conditions. Sensible heat refers to heat that, when added to or removed from the conditioned air, results in a temperature change of the conditioned air. Latent heat refers to heat that, when added to or removed from the conditioned air, results in a phase change of, for example, water within the conditioned air. Sensible-to-total ratio ("S/T ratio") is a ratio of sensible heat to total heat (sensible heat+latent heat). The lower the S/T ratio, the higher the latent cooling capacity of the HVAC system for given environmental conditions. The S/T ratio is negative in the case of heating.

Sensible cooling load refers to an amount of heat that must be removed from the enclosed space to accomplish a desired temperature change of the air within the enclosed space. The sensible cooling load is reflected by a temperature within the enclosed space as read on a dry-bulb thermometer. Latent cooling load refers to an amount of heat that must be removed from the enclosed space to accomplish a desired change in humidity of the air within the enclosed space. The latent cooling load is reflected by a temperature within the enclosed space as read on a wet-bulb thermometer. Setpoint or temperature setpoint refers to a target temperature setting of the HVAC system as set by a user or automatically based on a pre-defined schedule.

When there is a high sensible cooling load such as, for example, when outside-air temperature is significantly warmer than an inside-air temperature setpoint, the HVAC system will continue to operate in an effort to effectively cool and dehumidify the conditioned air. Such operation of the HVAC system is known as "cooling mode." When there is a low sensible cooling load but high relative humidity such as, for example, when the outside air temperature is relatively close to the inside air temperature setpoint, but the outside air is considerably more humid than the inside air, supplemental air dehumidification is often undertaken to avoid occupant discomfort. Such operation of the HVAC system is known as "re-heat mode."

An existing approach to air dehumidification involves lowering the temperature setpoint of the HVAC system. This approach causes the HVAC system to operate for longer periods of time than if the temperature setpoint of the HVAC system were set to a higher temperature. This approach serves to reduce both the temperature and humidity of the conditioned air. However, this approach results in over-cooling of the conditioned air, which over-cooling often results in occupant discomfort. Additionally, consequent extended run times cause the HVAC system to consume more energy, which leads to higher utility costs.

Another air dehumidification approach involves re-heating of air leaving an evaporator coil. This approach typically involves directing refrigerant from the compressor to a re-heat coil positioned adjacent to the evaporator coil. The re-heat coil transfers some heat energy from the refrigerant to the air leaving the evaporator thereby raising the temperature of air leaving the evaporator and lowering the temperature of the refrigerant before the refrigerant moves to the condenser.

FIG. 1 illustrates an HVAC system 100. In various embodiments, the HVAC system 100 is a networked HVAC system that is configured to condition air via, for example, heating, cooling, humidifying, or dehumidifying air within an enclosed space 101. In various embodiments, the enclosed space 101 is, for example, a house, an office building, a warehouse, and the like. Thus, the HVAC system 100 can be a residential system or a commercial system such as, for example, a roof top system. For exemplary illustration, the HVAC system 100 as illustrated in FIG. 1 includes various components; however, in other embodiments, the HVAC system 100 may include additional components that are not illustrated but typically included within HVAC systems.

The HVAC system 100 includes a circulation fan 110, a gas heat 120, electric heat 122 typically associated with the circulation fan 110, and a refrigerant evaporator coil 130, also typically associated with the circulation fan 110. The circulation fan 110, the gas heat 120, the electric heat 122, and the refrigerant evaporator coil 130 are collectively referred to as an "indoor unit" 148. In various embodiments, the indoor unit 148 is located within, or in close proximity to, the enclosed space 101. The HVAC system 100 also includes a compressor 140 and an associated condenser coil 142, which are typically referred to as an "outdoor unit" 144. In various embodiments, the outdoor unit 144 is, for example, a rooftop unit or a ground-level unit. The compressor 140 and the associated condenser coil 142 are connected to an associated evaporator coil 130 by a refrigerant line 146. In various embodiments, the compressor 140 is, for example, a single-stage compressor, a multi-stage compressor, a single-speed compressor, or a variable-speed compressor. In various embodiments, the circulation fan 110, sometimes referred to as a blower, may be configured to operate at different capacities (i.e., variable motor speeds) to circulate air through the HVAC system 100, whereby the circulated air is conditioned and supplied to the enclosed space 101.

Still referring to FIG. 1, the HVAC system 100 includes an HVAC controller 150 that is configured to control operation of the various components of the HVAC system 100 such as, for example, the circulation fan 110, the gas heat 120, the electric heat 122, and the compressor 140 to regulate the environment of the enclosed space 101. In some embodiments, the HVAC system 100 can be a zoned system. In such embodiments, the HVAC system 100 includes a zone controller 180, dampers 185, and a plurality of environment sensors 160. In various embodiments, the HVAC controller 150 cooperates with the zone controller 180 and the dampers 185 to regulate the environment of the enclosed space 101.

The HVAC controller 150 may be an integrated controller or a distributed controller that directs operation of the HVAC system 100. The HVAC controller 150 includes an interface to receive, for example, thermostat calls, temperature setpoints, blower control signals, environmental conditions, and operating mode status for various zones of the HVAC system 100. For example, in various embodiments, the environmental conditions may include indoor temperature and relative humidity of the enclosed space 101. In various embodiments, the HVAC controller 150 also includes a processor and a memory to direct operation of the HVAC system 100 including, for example, a speed of the circulation fan 110.

Still referring to FIG. 1, in some embodiments, the plurality of environment sensors 160 are associated with the HVAC controller 150 and also optionally associated with a user interface 170. The plurality of environment sensors 160 provide environmental information within a zone or zones of the enclosed space 101 such as, for example, temperature and humidity of the enclosed space 101 to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101, and calculate operational parameters of the HVAC system 100 as disclosed herein.

In various embodiments, the HVAC system 100 is configured to communicate with a plurality of devices such as, for example, a monitoring device 156, a communication device 155, and the like. In various embodiments, the monitoring device 156 is not part of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In various embodiments, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In various embodiments, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101. Each of the designated zones include at least one conditioning or demand unit such as, for example, the gas heat 120 and at least one user interface 170 such as, for example, the thermostat. The zone-controlled HVAC system 100 allows the user to independently control the temperature in the designated zones. In various embodiments, the zone controller 180 operates electronic dampers 185 to control air flow to the zones of the enclosed space 101.

In some embodiments, a data bus 190, which in the illustrated embodiment is a serial bus, couples various components of the HVAC system 100 together such that data is communicated therebetween. The data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the circulation fan 110 or the plurality of environment sensors 160.

Figure 2:
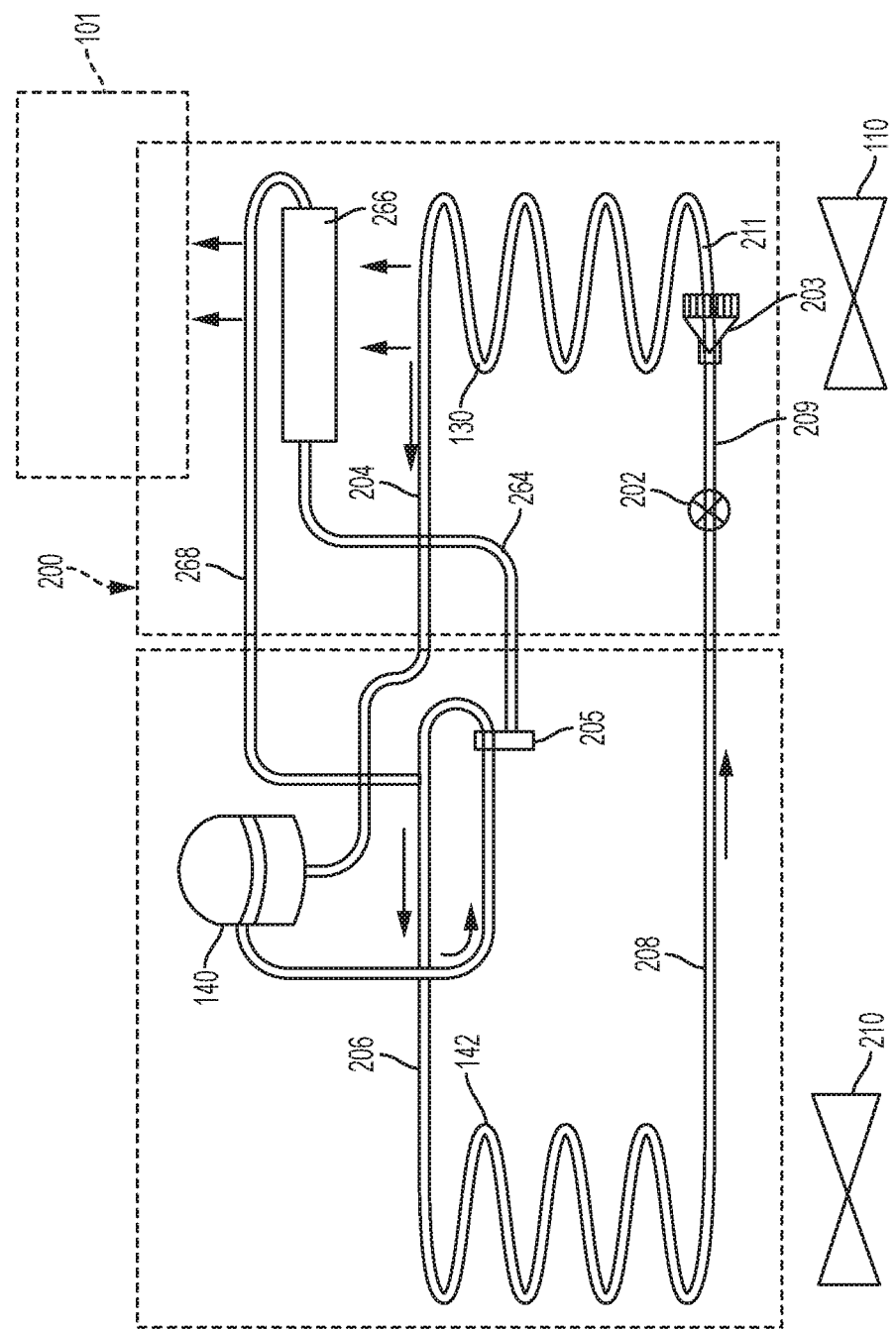
FIG. 2 is a schematic diagram of the HVAC system of FIG. 1.

FIG. 2 is a schematic diagram of an exemplary HVAC system 200. For purposes of discussion. FIG. 2 is described herein relative to FIG. 1. The HVAC system 200 includes the evaporator coil 130, the condenser coil 142, the compressor 140, a metering device 202, and a distributor 203. In various embodiments, the metering device 202 is, for example, a thermostatic expansion valve or a throttling valve. The evaporator coil 130 is fluidly coupled to the compressor 140 via a suction line 204. The compressor 140 is fluidly coupled to the condenser coil 142 via a discharge line 206. The condenser coil 142 is fluidly coupled to the metering device 202 via a liquid line 208. The metering device 202 is fluidly coupled to the distributor 203 via an evaporator intake line 209. The distributor 203 divides refrigerant flow into an evaporator circuit line 211 and directs refrigerant to the evaporator coil 130. By way of illustration, FIG. 2 shows a single evaporator circuit line 211; however, one skilled in the art will recognize that any number of evaporator circuit lines 211 could be utilized to direct refrigerant from the distributor 203 to the evaporator coil 130.

Still referring to FIG. 2, during operation, low-pressure, low-temperature refrigerant is circulated through the evaporator coil 130. The refrigerant is initially in a liquid/vapor state. In various embodiments, the refrigerant is, for example, R-22, R-134a, R-410A, R-744, or any other suitable type of refrigerant. Air from within the enclosed space 101, which is typically warmer than the refrigerant, is circulated around the refrigerant evaporator coil 130 by the circulation fan 110. In various embodiments, the refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is introduced into the compressor 140 via the suction line 204. The compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant leaves the compressor 140 via a discharge line 206 and enters a re-heat valve 205. When operating in re-heat mode, the re-heat valve 205 directs at least a portion of the high-pressure, high-temperature, superheated vapor refrigerant to a re-heat coil 266 via a re-heat feed line 264. The re-heat coil is positioned down wind of the evaporator coil 130. The re-heat coil 266 transfers heat energy from the high-pressure, high-temperature, superheated vapor refrigerant to air leaving the evaporator coil 130 thereby raising a temperature of air leaving the evaporator coil 130. The refrigerant then returns to the discharge line 206 via a re-heat return line 268. Upon returning to the discharge line 206, the refrigerant moves to the condenser 142.

When operating in cooling mode, the re-heat valve 205 directs the high-pressure, high-temperature, superheated vapor refrigerant from the compressor 140 to the condenser coil 142 via the discharge line 206. Outside air is circulated around the condenser coil 142 by a condenser fan 210. The outside air is typically cooler than the high-pressure, high-temperature, superheated vapor refrigerant present in the condenser coil 142. Thus, heat is transferred from the high-pressure, high-temperature, superheated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced by, for example, regulating an amount of refrigerant that travels to the distributor 203. Abrupt reduction of the pressure of the high-pressure, high-temperature, sub-cooled liquid refrigerant causes sudden, rapid, evaporation of a portion of the high-pressure, high-temperature, sub-cooled liquid refrigerant, commonly known as flash evaporation. The flash evaporation lowers the temperature of the resulting liquid/vapor refrigerant mixture to a temperature lower than a temperature of the air in the enclosed space 101. The liquid/vapor refrigerant mixture leaves the metering device 202 and enters the distributor 203 via the evaporator intake line 209. The distributor 203 divides refrigerant flow into the evaporator circuit line 211 and directs refrigerant to the evaporator coil 130.

Figure 3:
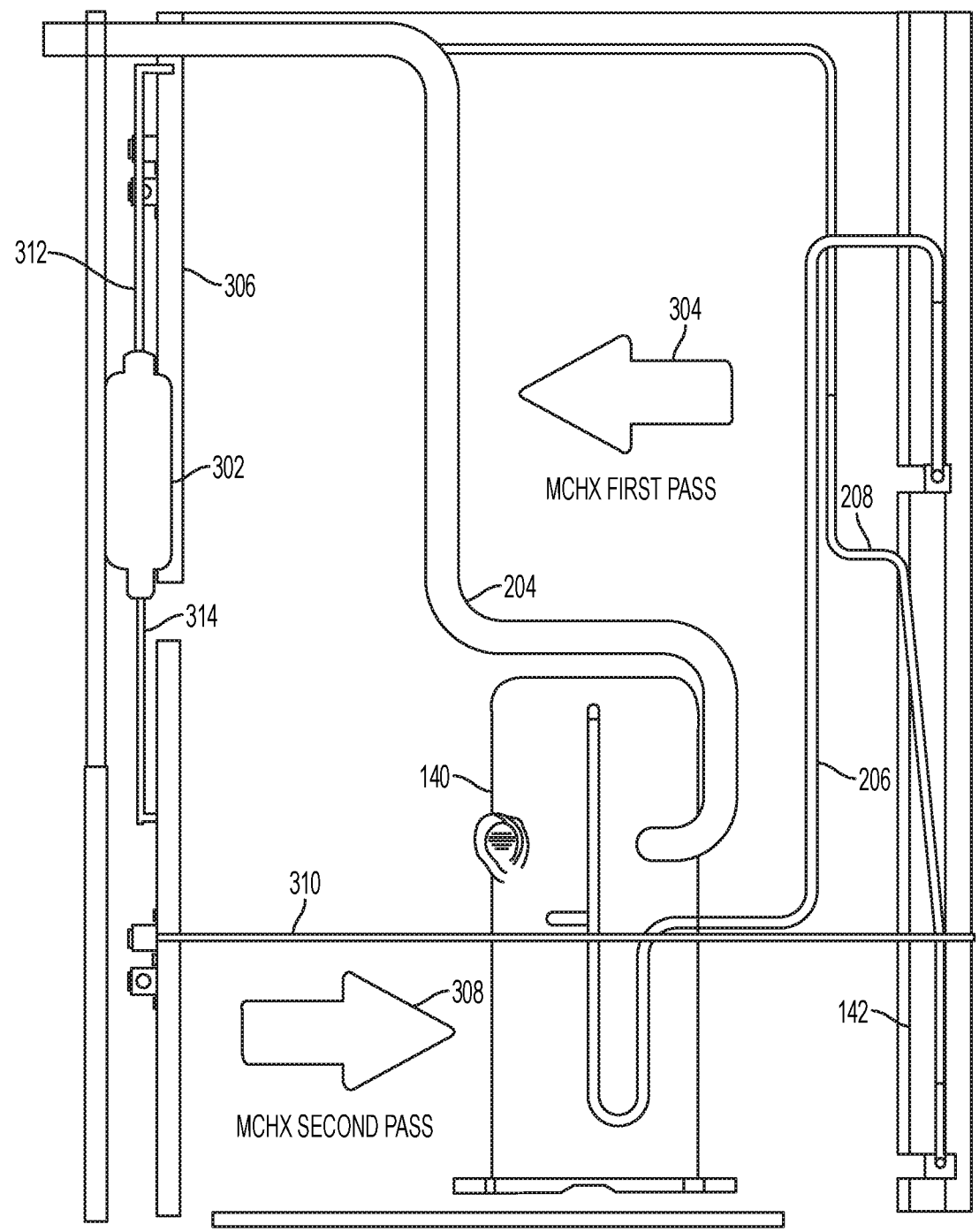
FIG. 3 is a side view of a condenser of the exemplary HVAC system of FIG. 1.
Figure 4:
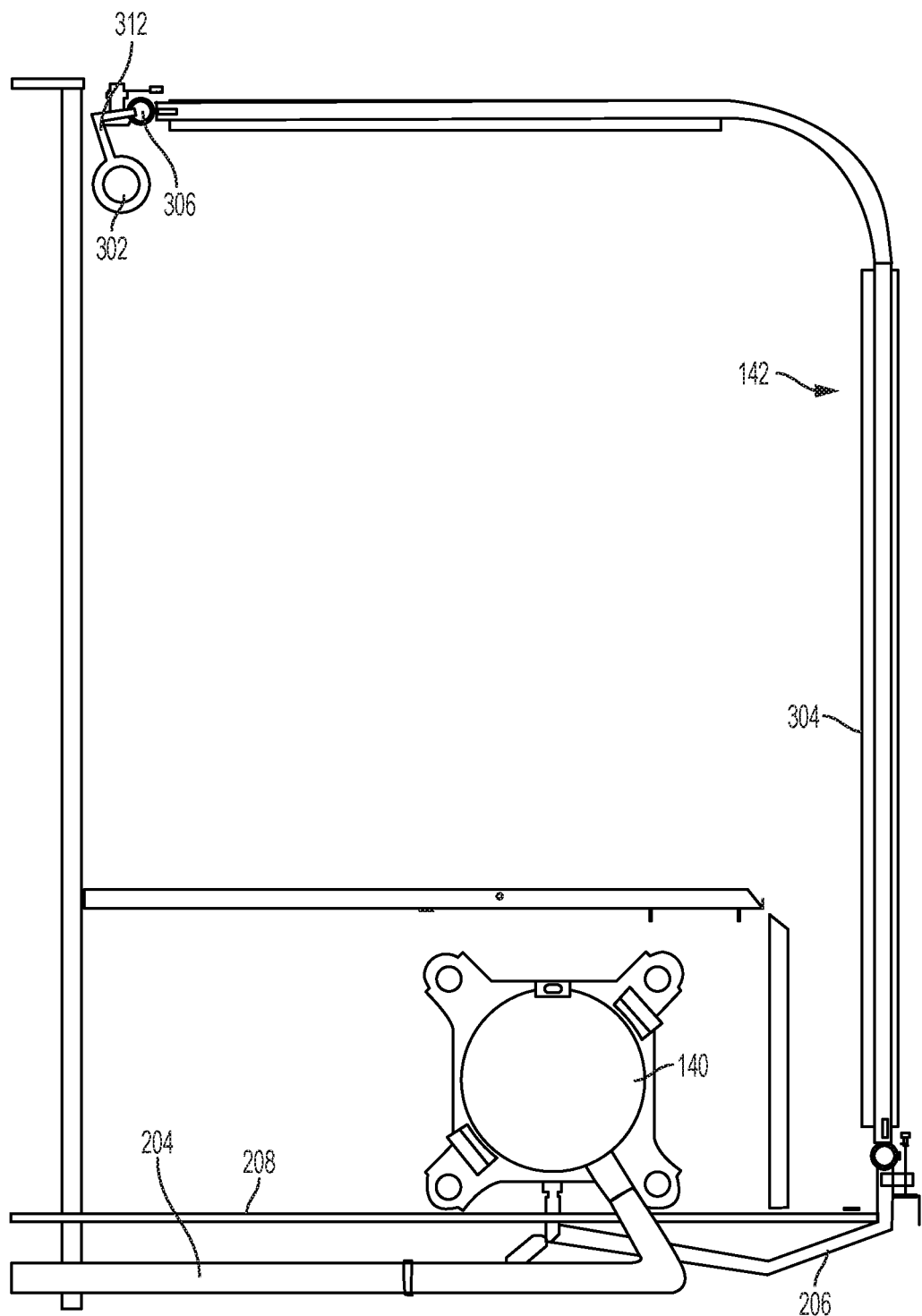
FIG. 4 is a top view of the condenser of FIG. 3.

FIG. 3 is a side view of the condenser 142 of the HVAC system 200 utilizing a common manifold charge compensator 302. FIG. 4 is a top view of the condenser 142 of FIG. 3. For purposes of illustration. FIGS. 3-4 are discussed herein relative to FIGS. 1-2. As noted above, low-pressure, low-temperature, super-heated vapor refrigerant is introduced into the compressor 140 via the suction line 204. The compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, super-heated vapor refrigerant. The high-pressure, high-temperature, superheated vapor refrigerant travels from the compressor 140 to the condenser coil 142 via the discharge line 206. The discharge line 206 is fluidly coupled to a first pass 304 of the condenser coil 142. In various embodiments, the first pass 304 of the condenser coil 142 includes a plurality of micro channels to facilitate heat transfer between the refrigerant and outside air. Outside air is circulated around the condenser coil 142 by the condenser fan 210. Upon leaving the first pass 304 of the condenser coil 142, the refrigerant enters a common manifold 306 as a saturated liquid/gas mixture.

Still referring to FIGS. 3-4, the common manifold 306 is fluidly coupled to the first pass 304 of the condenser coil 142 and a second pass 308 of the condenser coil 142. Liquid refrigerant present in the saturated liquid/gas mixture accumulates in a bottom portion of the common manifold 306 below a maximum liquid level. For purposes of illustration, the maximum liquid level is illustrated in FIG. 3 with line 310. Vapor refrigerant present in the saturated liquid/gas mixture remains in the common manifold 306 above the liquid refrigerant. The second pass 308 of the condenser coil 142 includes a plurality of micro channels to facilitate heat transfer between the refrigerant and outside air. Upon leaving the second pass 308, high-pressure, high-temperature, sub-cooled liquid refrigerant leaves the condenser coil 142 via the liquid line 208 and enters the metering device 202.

Still referring to FIGS. 3-4, the common manifold charge compensator 302 is fluidly coupled to the common manifold 306 via an upper connection line 312 and a lower connection line 314. The upper connection line 312 is fluidly coupled to the common manifold 306 near a top of the common manifold 306 proximate an output of the first pass 304. The lower connection line 314 is fluidly coupled to the common manifold 306 above the maximum liquid level 310 proximate the second pass 308. Because the lower connection line 314 is coupled to the common manifold 306 above the maximum liquid level 310, liquid refrigerant does not enter the charge compensator 302 via the lower connection line 314. At normal refrigerant pressure, liquid refrigerant that enters the charge compensator 302 via the upper connection line 312 is driven out of the charge compensator 302 via the lower connection line 314 due to a pressure differential between the first pass 304 and the second pass 308.

Still referring to FIGS. 3-4 during periods of elevated refrigerant discharge pressure, liquid refrigerant enters the charge compensator 302 via at least one of the upper connection line 312 and the lower connection line 314. Thus, liquid refrigerant fills the extra volume provided by the charge compensator 302 and prevents backup of liquid refrigerant into the discharge line 206. When refrigerant pressure returns to normal refrigerant pressure, the liquid refrigerant drains from the charge compensator 302 due to gravity through the lower connection line 314 as well as due to a pressure difference between the upper connection line 312 and the lower connection line 314. Thus, no heat is required to remove liquid from the charge compensator 302.

Figure 5:
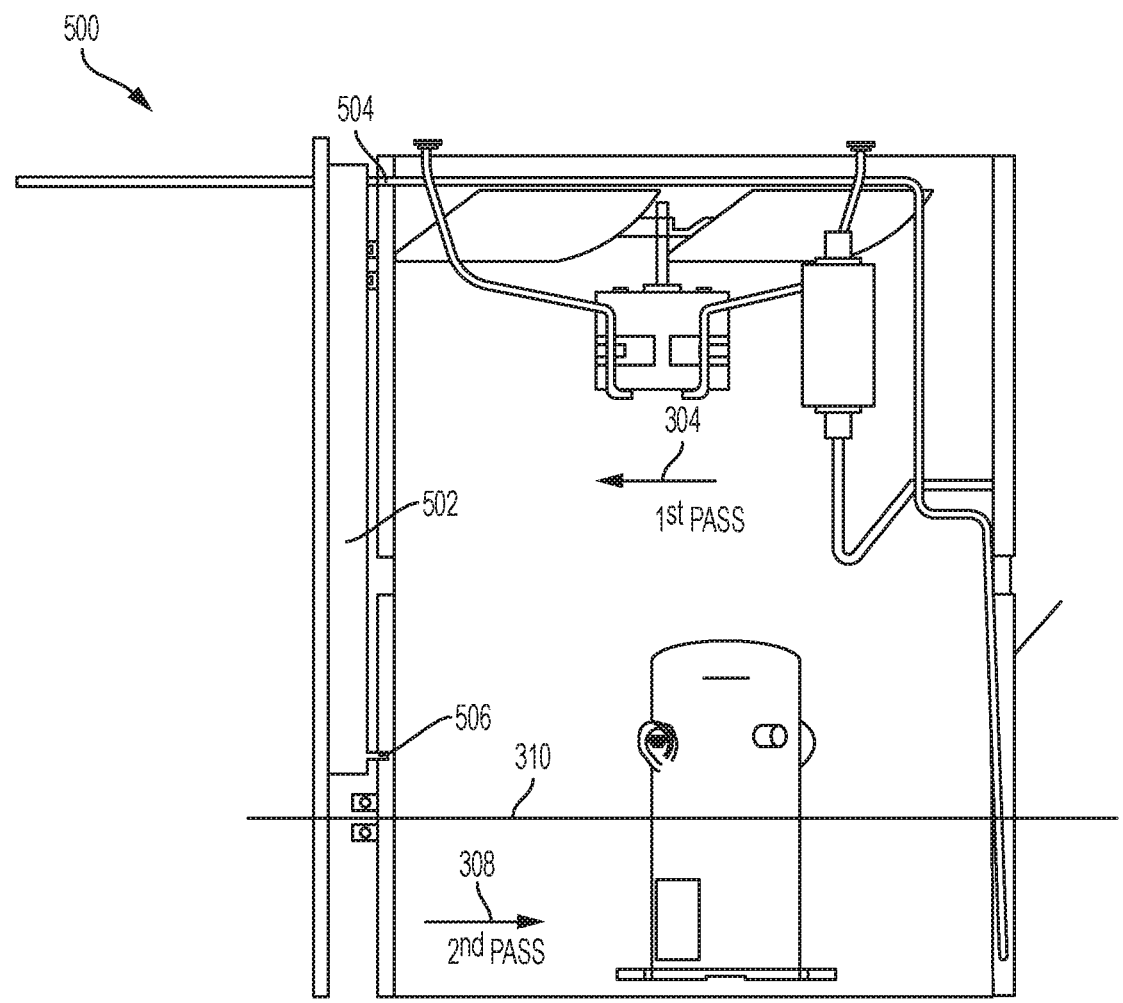
FIG. 5 is a side view of a condenser of an exemplary HVAC system utilizing a tube manifold charge compensator.

FIG. 5 is a side view of an exemplary HVAC system 500 utilizing a tube manifold charge compensator 502. Similar to the HVAC system discussed above in FIGS. 3-4, the tube manifold charge compensator 502 includes a upper connection 504 that is fluidly coupled to the first pass 304 of the condenser 142 and a lower connection 506 that is fluidly coupled to the second pass 308 of the condenser 142. A bottom of the tube manifold charge compensator 502 is positioned above a maximum liquid level 310 of the condenser 142.

Figure 6:
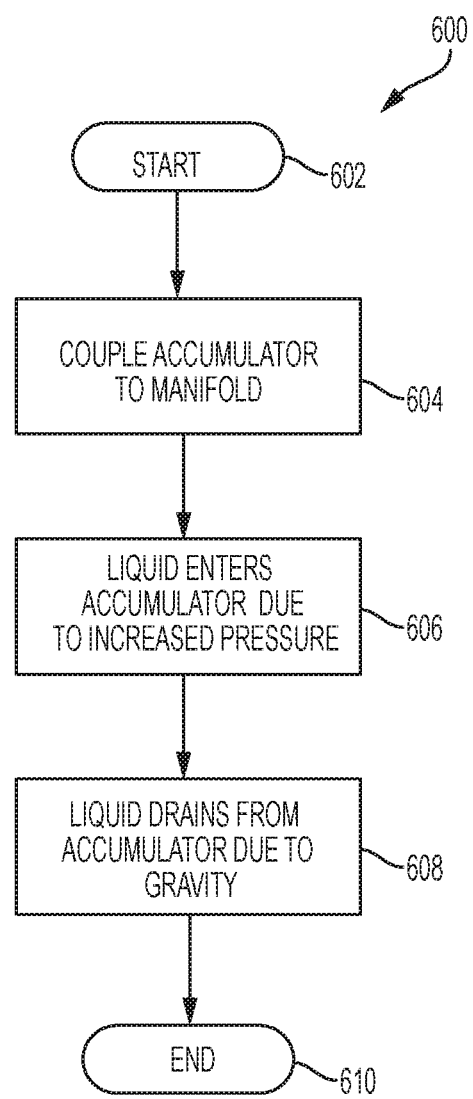
FIG. 6 is a flow diagram of an exemplary process for accommodating variations in condenser refrigerant discharge pressure.

FIG. 6 is a flow diagram of a process 600 for accommodating variations in condenser refrigerant discharge pressure. The process 600 begins at step 602. At step 604, a charge compensator 302 is coupled to a common manifold 306 above the maximum liquid level 310. At step 606, liquid refrigerant enters the charge compensator 302 responsive to increased condenser refrigerant pressure. At step 608, liquid refrigerant drains from the charge compensator 302 due to gravity responsive to the condenser refrigerant pressure returning to normal refrigerant pressure. The process 600 ends at step 610.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A heating, ventilation, and air conditioning ("HVAC") system comprising:
   an evaporator;
   a compressor fluidly coupled to the evaporator via a suction line;
   a condenser fluidly coupled to the compressor via a discharge line, the condenser comprising a first pass and a second pass;
   a common manifold fluidly coupling the first pass and the second pass;
   wherein the common manifold comprises an upper section and a lower section that are disjointed; and
   a charge compensator fluidly coupled to the common manifold via an upper connection line and a lower connection line.

2. The HVAC system of claim 1, comprising:
   a metering device fluidly coupled to the second pass of the condenser;
   a distributor fluidly coupled to the metering device; and
   wherein the evaporator is fluidly coupled to the distributor via a plurality of evaporator circuit lines.

3. The HVAC system of claim 1, wherein the condenser comprises a plurality of microchannels.

4. The HVAC system of claim 1, wherein:
   the upper connection line is fluidly coupled to the upper section of the common manifold proximate the first pass; and
   the lower connection line is fluidly coupled to the lower section of the common manifold proximate the second pass.

5. The HVAC system of claim 1, wherein:
   the condenser operates at one of a first refrigerant pressure and a second refrigerant pressure, wherein the second refrigerant pressure is greater than the first refrigerant pressure; and
   the charge compensator contains only refrigerant vapor at the first refrigerant pressure.

6. The HVAC system of claim 5, wherein liquid refrigerant enters the charge compensator via at least one of the upper connection line and the lower connection line when the condenser operates at the second refrigerant pressure.

7. The HVAC system of claim 6, wherein, upon returning to the first refrigerant pressure, the liquid refrigerant drains due to gravity from the charge compensator as well as due to pressure difference across the charge compensator.

8. A condenser, comprising:
   a first plurality of microchannels;
   a second plurality of microchannels;
   a common manifold fluidly coupling the first plurality of microchannels and the second plurality of microchannels;
   wherein the common manifold comprises an upper section and a lower section that are disjointed; and
   a charge compensator fluidly coupled to the common manifold via an upper connection line and a lower connection line.

9. The condenser of claim 8, wherein:
   the upper connection line is fluidly coupled to the upper section of the common manifold proximate the first plurality of microchannels; and
   the lower connection line is fluidly coupled to the lower section of the common manifold proximate the second plurality of microchannels.

10. The condenser of claim 8, wherein:
    the condenser operates at one of a first refrigerant pressure and a second refrigerant pressure, wherein the second refrigerant pressure is greater than the first refrigerant pressure; and
    the charge compensator contains only refrigerant vapor at the first refrigerant pressure.

11. The condenser of claim 10, wherein liquid refrigerant enters the charge compensator via at least one of the upper connection line and the lower connection line when the condenser operates at the second refrigerant pressure.

12. The condenser of claim 11, wherein, upon returning to the first refrigerant pressure, the liquid refrigerant drains due to gravity from the charge compensator as well as due to pressure difference across the charge compensator.

13. A method for addressing elevated discharge pressure, the method comprising:
    fluidly coupling a common manifold to a first pass and a second pass of a condenser, wherein the common manifold comprises an upper section and a lower section that are disjointed; and
    fluidly coupling a charge compensator to the upper section of the common manifold and the lower section of the common manifold via an upper connection line and a lower connection line, respectively.

14. The method of claim 13, wherein:
    the condenser operates at one of a first refrigerant pressure and a second refrigerant pressure, wherein the second refrigerant pressure is greater than the first refrigerant pressure; and
    the charge compensator contains only refrigerant vapor at the first refrigerant pressure.

15. The method of claim 14, wherein liquid refrigerant enters the charge compensator via at least one of the upper connection line and the lower connection line when the condenser operates at the second refrigerant pressure.

16. The method of claim 15, wherein, upon returning to the first refrigerant pressure, the liquid refrigerant drains due to gravity from the charge compensator and pressure difference across the charge compensator.

17. The method of claim 13, wherein:
    the first pass comprises a plurality of microchannels; and
    the second pass comprises a plurality of microchannels.

* * * * *